United States Patent [19]

Colombo

[11] Patent Number: 5,042,344

[45] Date of Patent: Aug. 27, 1991

[54] GUILLOTINE SHEARING MACHINE, ESPECIALLY FOR CONTINUOUS BANDS, WITH BLADES TRANSLATING PARALLEL, ONE TOWARDS THE OTHER, ON CIRCULAR TRAJECTORIES

[75] Inventor: Giordano Colombo, Bulciago, Italy

[73] Assignee: SA.LI.CO. S.n.c., Sirone, Italy

[21] Appl. No.: 359,652

[22] PCT Filed: Dec. 29, 1986

[86] PCT No.: PCT/IT86/00093
§ 371 Date: Apr. 14, 1989
§ 102(e) Date: Apr. 14, 1989

[87] PCT Pub. No.: WO88/03070
PCT Pub. Date: May 5, 1988

[30] Foreign Application Priority Data

Oct. 20, 1986 [IT] Italy ................. 22184 A/86

[51] Int. Cl.⁵ ............................. B23D 25/08
[52] U.S. Cl. ........................... 83/343; 83/345; 83/337
[58] Field of Search ............... 83/345, 341, 343, 76.7, 83/76.9, 337, 294

[56] References Cited

U.S. PATENT DOCUMENTS

| | | | |
|---|---|---|---|
| 1,913,153 | 6/1933 | De Salardi | 83/76 |
| 1,988,215 | 1/1935 | Peterson | 83/337 |
| 2,336,957 | 12/1943 | Pierce | 83/343 |
| 3,869,948 | 3/1975 | Rau | 83/345 |
| 4,218,944 | 8/1980 | Sclippa | 83/345 |
| 4,691,603 | 9/1987 | Winnemöller | 83/343 |

Primary Examiner—Douglas D. Watts
Assistant Examiner—John M. Husar
Attorney, Agent, or Firm—Michael J. Striker

[57] ABSTRACT

Guillotine shearing machine, especially for cutting continuous metal bands (90) in which each of the two longitudinal blades (15), (16) counterposed by means of connections to connecting rods (39), (40), (41), (42) each supported by a pair of cranks (31-32), (35-36) and (33-34), (37-38), translates, both parallel to each other, on equal circular trajectories in such a way that one blade (15) encountering the other (16) in proximity to the cutting plane and progressively superimposing each other, effects the cut, speed of the blades (15), (16) in each cycle being regulated according to the sliding speed of the band (90) so that in the zone of contact the speed of the blades (15), (16) coincides with that of the band (90) enabling pieces of band to be cut off in whatever length is desired.

1 Claim, 4 Drawing Sheets

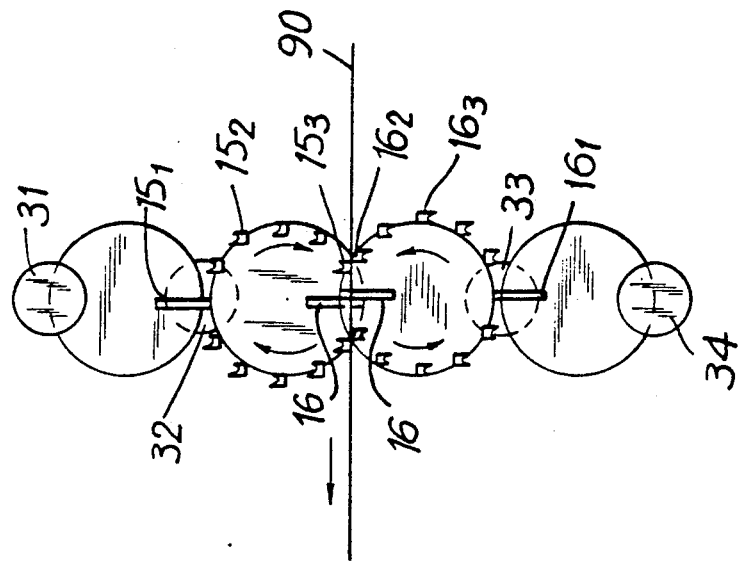
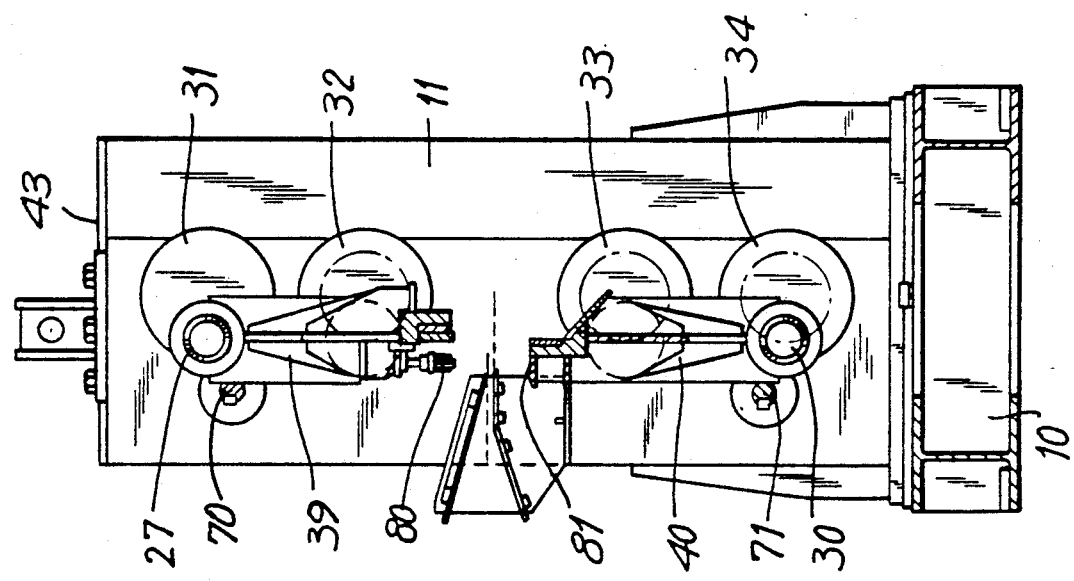

GUILLOTINE SHEARING MACHINE, ESPECIALLY FOR CONTINUOUS BANDS, WITH BLADES TRANSLATING PARALLEL, ONE TOWARDS THE OTHER, ON CIRCULAR TRAJECTORIES

BACKGROUND OF THE INVENTION

The so-named guillotine shearing machine is a well-known tool. One blade, generally the upper one, is mobile and slides on runners which keep the movement rectilinear and transversal to the cutting plane. The blade is operated by cams or by hydraulic systems. Shearing machines used for cutting lengths of sheet metal, profiles, continuous moving bands, comprise a pair of drums between which the band passes, and radially set blades which meet at the shearing plane to cut through the moving piece.

The radial position of the blades obviously determines the angle they assume, which angle varies progressively during cutting. This means that the advantages of speed and simplicity in continuously cutting a moving band are to some extent adversely affected and the operation lacks that precision which can only be obtained with blades set perfectly perpendicular to the piece to be cut. The invention here described avoids these drawbacks at the same time offering considerable advantages as will now be explained.

SUMMARY OF THE INVENTION

Subject of the invention is a guillotine shearing machine, especially one for cutting continuous metal bands, wherein the opposing longitudinal blades translate parallel one to another along equal circular trajectories with parallel axes of rotation lying on the same geometrical plane. Blade movement is reciprocally synchronized. The phases in movement of one blade in relation to the other are such that one blade meets the other close to the shearing plane becoming progressively superimposed to make the cut.

The start of each cutting cycle, corresponding to a 360° rotation of the blades, is controlled in relation to certain speeds at which the band, or any other piece to be cut, and the blades move during the cycle, and at the most suitable instant for cutting off the desired length of the band.

Blade speed is adjusted according to that of the band to be cut in such a way that, when the cut is made, the speed of the cutting edge practically coincides with that of band movement. The blade is moved by means of a double pair of cranks for each of the two blades, one pair being situated at each end of the blade. The two cranks in each pair are connected by sprocket wheels with an idling sprocket wheel in between them.

The pairs of cranks at each end of the blade are connected by a longitudinal shaft to ensure synchronized movement, preferably by pairs of gears.

The drive shaft is preferably fixed to the upper crank of the lower blade, connected to the lower crank of the upper blade by a pair of sprocket wheels.

Synchronizing shafts between the pairs of cranks for each blade are respectively connected, by means of gears, to the sprocket wheel fixed to the upper crank of the lower blade, and to the sprocket wheel fixed to the lower crank of the upper blade.

Each blade is fixed at either end to two connecting rods respectively connected to the cranks forming either of the pairs that support each of the above blades at both ends.

The connecting rods of the upper blade support an elastic presser acting over the whole width of the translating band, at the moment when the blades meet, accompanying their movement and at the same time stabilizing their vertical position to hold the band relatively steady in relation to the blades that make the cut.

At the beginning of the cut, said elastic presser is in contraposition to a support of the band fixed to the lower blade close to the cutting edge. Therefore, close to the cut and while it is being made, said support causes that part of the band as yet uncut to be raised to the progressive level of the lower blade where it remains until completion of the cut extending from one longitudinal edge of the band to the other. In so raising the band by means of the support fixed to the lower blade, speed of the band and of the cutting edge of the lower blade round its circular trajectory are kept practically equal until completion of the cut.

The start of each shearing cycle to cut off the desired length of band, in each cycle, as well as regulation of blade rotation speed, in each cycle, according to the speed at which the band moves so that blade and band speeds shall be equal when the blade makes contact with the band, is operated automatically by an electronic control panel which memorizes the information received from sensors applied to the band and which, according to the speed of band movement and according to a program typed in on a keyboard or by some other means, has one or more shearing cycles carried out for cutting off one or more equal or different lengths of band, as desired.

The characteristics and purposes of the invention will be made still clearer by the following examples of its execution illustrated by drawings.

BRIEF DESCRIPTION OF THE DRAWINGS

FIG. 3 Cross section view of the same machine.

FIG. 4 Diagram to show blade movements.

DETAILED DESCRIPTION OF THE PREFERRED EMBODIMENTS

Figure 1:
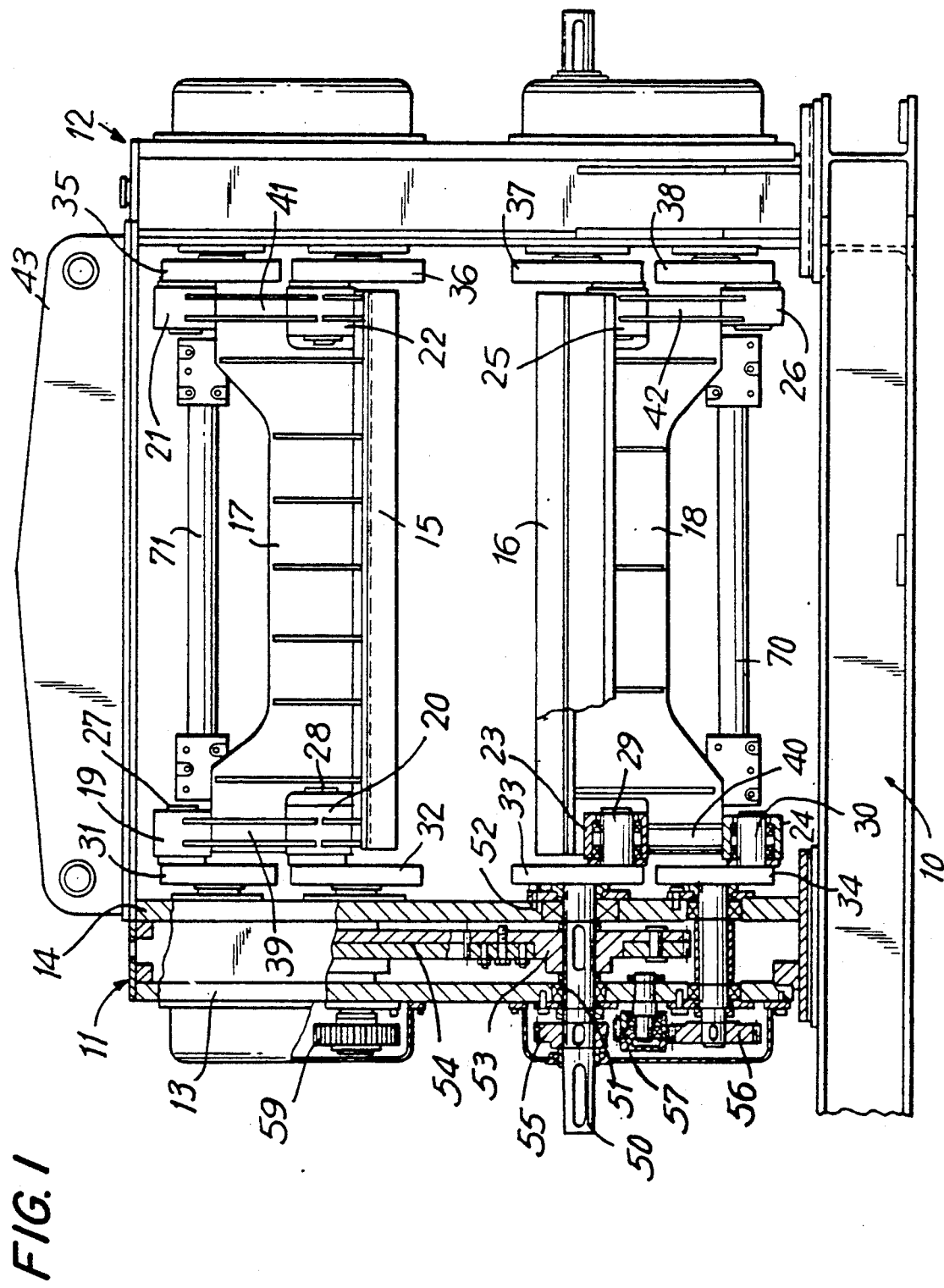
FIG. 1 Guillotine shearing machine, subject of the invention, seen from the front.

The shearing machine, subject of the invention, comprises a base (10) and uprights (11), (12) connected at the top by the head (43). Each upright comprises in turn the side pieces (13), (14).

The upper (15) and lower (16) longitudinal blades are respectively supported by frames (17), (18), the upper one comprises the bushings (19)-(20) and the lower one comprises the bushings (23-26).

Said bushings house the rotatable pins (27), (28) and (29), (30) of the cranks (31), (32) and (33), (34) which determine the cutting movement of the blades.

The extremities of the frames (17) and (18) create a kind of connecting rod (39), (40) and (41), (42) for respectively connecting the pairs of cranks (31-32), (33-34), (35-36) (37-38).

The drive shaft (50) is fixed to the crank (33) and can rotate on the bearings (51), (52) mounted respectively on the sides (13) and (14) of the upright (11).

By means of the sprocket wheel (53) and the opposing sprocket wheel (54), said shaft is similarly fixed to the crank (32) of the upper blade.

By means of the sprocket wheels (55) and (56) with intermediate idling sprocket wheel (57), the crank (33) is fixed in its movement to the crank (34).

Therefore, by means of the pins (29) and (30) and the bushings (23) and (24), the pair of cranks (33) and (34) determine the movement of the lower blade (16) in synchrony with the second pair of cranks (37), (38) connected by the connecting rod (42) and by other gears similar to those already described for the first pair of cranks.

The crank (32) is connected to the crank (31) by means of the connecting rod (39) realized with the frame (17) and with the connecting rod (41) of the same frame, fixed to the bushings (21) and (22).

Therefore, the cranks (35) and (36) at the other end of the frame (17) for the blade (15) are also made to move by mechanisms substantially the same as those already described for the lower blade, as the shafts for the two pairs of cranks respectively, on either side of the upper blade, are connected one to another by sprocket wheels like those already described (55), (56) and (57) and of which, for the sake of simplicity, only the sprocket wheel (59) fixed to the shaft of the crank (32) is indicated.

Synchronization of movement of the pairs of cranks (33–34) and (37–38) for the lower blade, and (31–32), (35–36) for the upper blade is ensured by the two horizontal shafts (70) and (71) supported on bearings like (60), (61) placed on on the sides like (13) and (14) of the uprights (11) and (12). Each of the two shafts is connected to the drive shaft (50) by means of gears like (62), fixed to the shaft (70) that engage with the sprocket wheel (53) mounted, as already explained, on said shaft (50).

On the upright (12) the shaft of crank (37) supports another sprocket wheel, not shown in the drawing, that engages a pinion fixed to the other end of the shaft (70) and carries out the same functions as the gear (62).

Mechanisms similar to those already described connect the shafts to cranks (31) and (35) with the longitudinal shaft (71) for synchronizing movement of the pairs of cranks for the upper blade.

An elastic presser 80 is fixed to the connecting rods (39), (41) of the upper blade. A support 81 substantially levelled with the lower blade 16, is fixed to the connecting rods 40, 42 of the lower blade.

FIG. 4 clearly shows the movements made by the upper (15) and lower (16) blades in their various positions as these positions change $(15_1)$, $(15_2)$, $(15_3)$ and respectively $(16_1)$, $(16_2)$, $(16_3)$, due to movement of the cranks.

At each shearing cycle the blades start from and return to the upper resting points $(15_1)$ and $(16_1)$.

When they have reached positions $(15_3)$ and $(16_3)$, the blades travel together with the band, little by little increasing the amount of superimposition, as they approach their lower resting points (15) and (16), and thus generating the cut.

Figure 2:
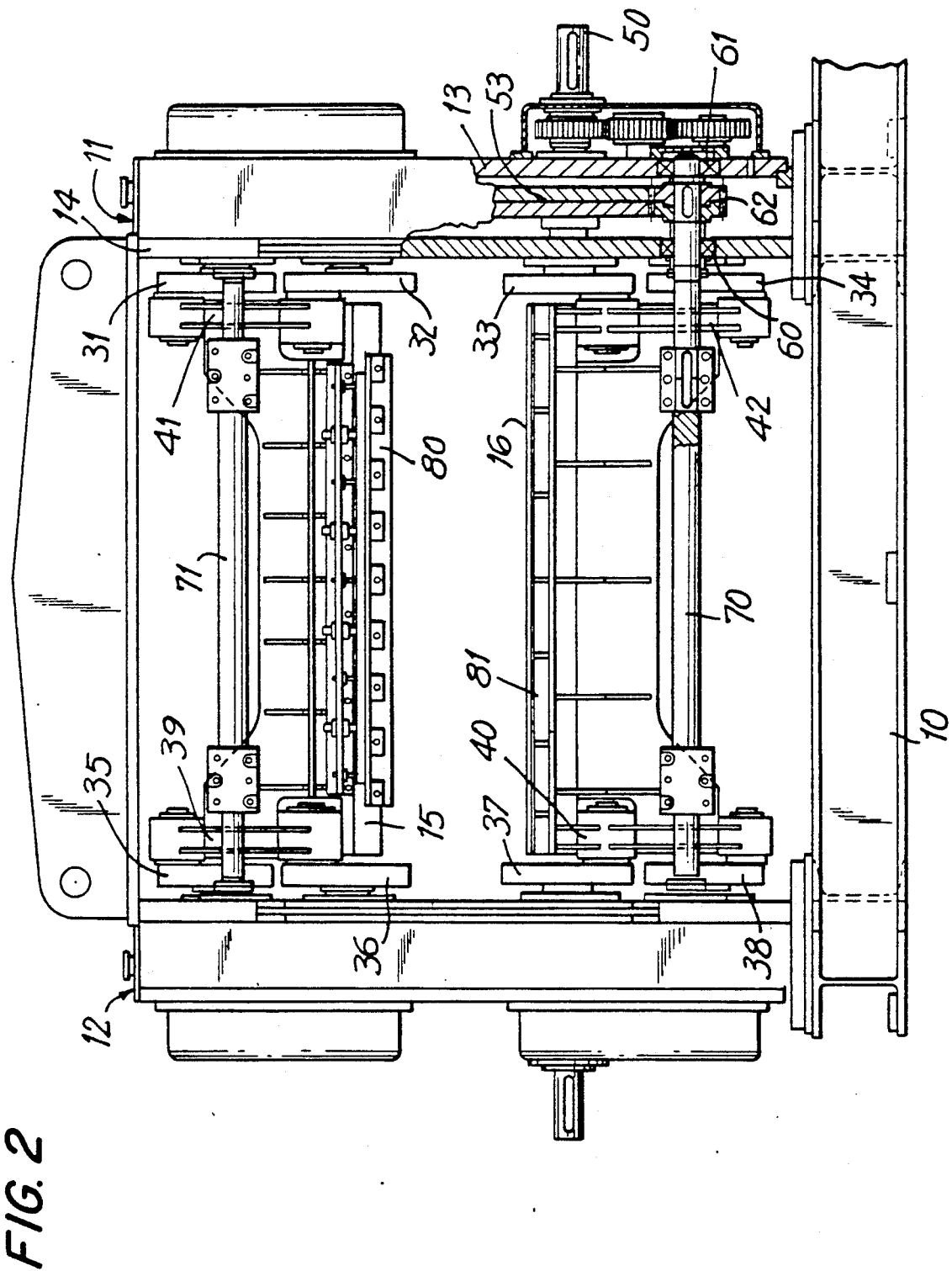
FIG. 2 The same machine seen from the back.
Figure 5:
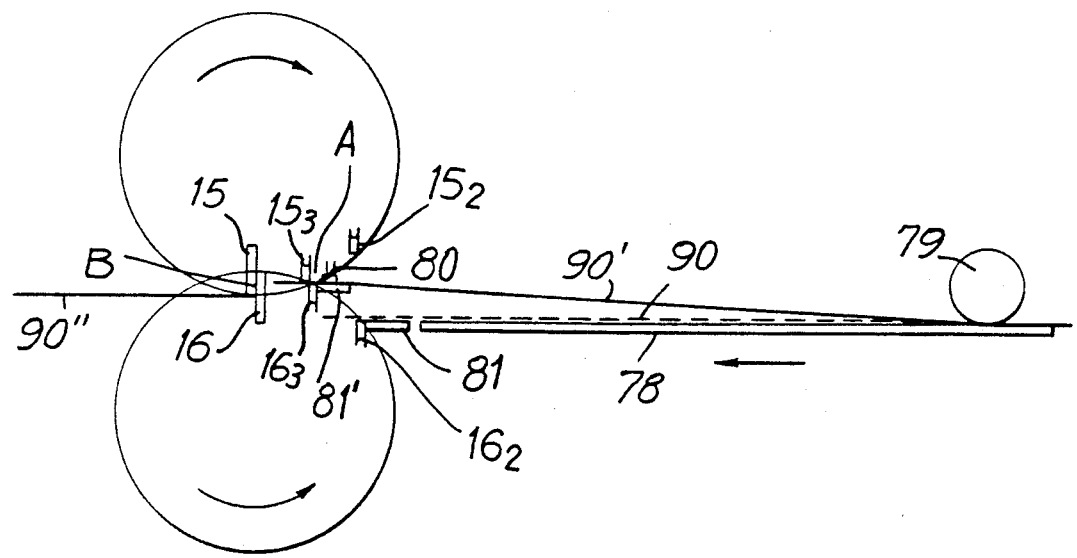
FIG. 5 Explanatory view showing cutting of a band with upper and lower blades.
Figure 6:
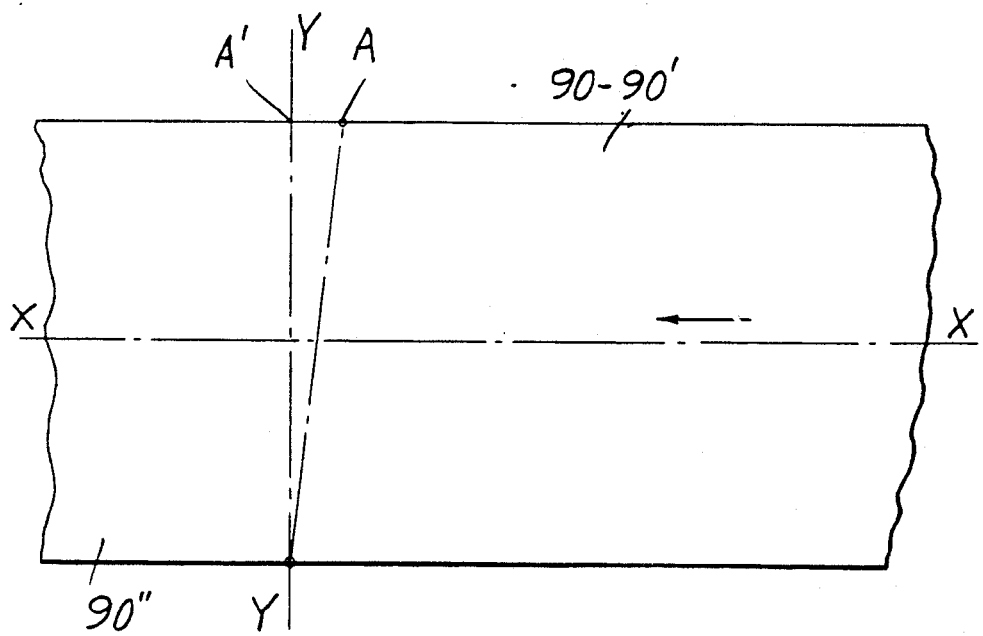
FIG. 6 Explanatory view showing the cut band.

During the cut (FIG. 5) upper blade 15 passes from position $15_3$ to position 15, while lower blade 16 passes from position $16_3$ to position 16; superimposing itself on blade 15 and completing the cut begun on one side of the band when the blades were in position $15_3$ and $16_3$. In the curve traced by lower blade 16 to pass from position $16_3$ to position 16, band 90 is raised by support 81 (FIGS. 2 and 3), together with blade 16. Thus the band speed at the start of contact with blade 16 remains equal to the circumferential speed of blade 16 until the cut is complete, ensuring the precision of the cut. During this cut support 81 fixed to blade 16 coincides with presser 80 fixed to blade 15. In FIG. 5 it can be clearly seen that band 90, raised by support 81, which moves to 81', assumes position 90', corresponding to the start of the cut at point A. Because of the rotation of the blades to their respective positions 15 and 16, the cut from point A (FIG. 6) to point B is completed. The speed of band 90, identical to that of blade 16 and support 81 during the cut from A to B (FIG. 6) ensures that point A moves to A', and thus that the cut BA' is along a YY axis perfectly orthogonal to the XX axis of the band.

The start of each shearing cycle to cut off the desired length of band, as well as regulation of blade rotation speed in each cycle according to the speed at which the band moves, is operated automatically by an electric control panel which memorizes the information received from sensors applied to the band and which, according to the speed at which it moves, and to a program put in on a keyboard or by some other controls, operates one or more cutting cycles for detaching one or more equal or different lengths of band, as required. The advantages offered by the invention are evident.

To summarise, though the band is continually moving, clean and precise cuts can be obtained, in the desired lengths, with the blades remaining always parallel in their cutting movements even though their trajectories are circular, and therefore being always transversal to the piece to be cut.

Compared therefore with the shearing machines at present in use, cutting is done at a speed and with a degree of precision never before achieved.

As the applications of the invention have been described as examples only, not limited to these, it is understood that every equivalent application of the inventive concepts explained, and any product manufactured and/or in operation according to the characteristics of the invention will be convered by its field of protection.

I claim:

1. A guillotine shearing machine for cutting continuous metal bands having a considerable width, said guillotine machine comprising upper and lower blades arranged at an angle to each other; means for synchronously moving said upper and lower blades towards each other and parallel to each other along circular paths around axes of rotation lying in one and same geometrical plane in such a manner that said upper and lower blades meet, at each cutting cycle after each blade being rotated by an angle of 360°, in proximity of a cutting plane with gradual superimposition for making a cut, said upper and lower blades having a common speed regulated in such a manner that the common speed coincides in a zone of contact of said upper and lower blades with the band, with a speed of the band; an elastic presser fixed to the upper blade and acting over an entire width of the band; and a band support fixed to the lower blade and movable therewith for progressively raising the band to maintain the speed of the band equal to the common speed of said blades during an entire cutting time whereby an accurate cut in a direction perpendicular to a direction of band movement is obtained.

* * * * *